(12) United States Patent
Ozaki et al.

(10) Patent No.: US 8,367,950 B2
(45) Date of Patent: Feb. 5, 2013

(54) KEY MODULE FOR MOBILE DEVICE

(75) Inventors: Kazuyuki Ozaki, Tokyo (JP); Takahisa Akatsuka, Tokyo (JP); Toshihiro Yanagimori, Tokyo (JP); Hiroaki Takada, Shizuoka (JP)

(73) Assignee: Nippon Mektron, Ltd., Tokyo (JP)

( * ) Notice: Subject to any disclaimer, the term of this patent is extended or adjusted under 35 U.S.C. 154(b) by 246 days.

(21) Appl. No.: 12/935,058

(22) PCT Filed: Mar. 9, 2009

(86) PCT No.: PCT/JP2009/054443
§ 371 (c)(1),
(2), (4) Date: Sep. 28, 2010

(87) PCT Pub. No.: WO2009/157218
PCT Pub. Date: Dec. 30, 2009

(65) Prior Publication Data
US 2011/0017580 A1    Jan. 27, 2011

(30) Foreign Application Priority Data

Jun. 26, 2008  (JP) .................................. 2008-167474
Nov. 14, 2008  (JP) .................................. 2008-292658

(51) Int. Cl.
*H01H 13/83* (2006.01)
(52) U.S. Cl. .......... 200/5 A; 200/516; 200/517; 200/314
(58) Field of Classification Search .................. 200/5 I, 200/516, 517, 310–317; 341/22; 345/168–170; 455/550.1
See application file for complete search history.

(56) References Cited

U.S. PATENT DOCUMENTS

| | | | | |
|---|---|---|---|---|
| 4,609,791 A | * | 9/1986 | Abbat | ........................... 200/5 A |
| 6,909,063 B2 | * | 6/2005 | Nam | ............................. 200/406 |
| 7,423,229 B2 | * | 9/2008 | Chen | ............................ 200/314 |
| 7,446,275 B2 | | 11/2008 | Lee et al. | |

(Continued)

FOREIGN PATENT DOCUMENTS

| | | |
|---|---|---|
| JP | 2001-167655 A | 6/2001 |
| JP | 2005-222786 A | 8/2005 |

(Continued)

OTHER PUBLICATIONS

Korean Office Action for Korean Patent Application No. 10-2010-7020317, dated Sep. 21, 2011, and English translation thereof.

*Primary Examiner* — Michael Friedhofer
(74) *Attorney, Agent, or Firm* — Harness, Dickey & Pierce, P.L.C.

(57) ABSTRACT

The key module for the mobile device includes a key top 6; a base plate 2 on which a fixed-side contact 7 is disposed; a dome 4 that is disposed on the fixed-side contact 7; a dome sheet 5 that covers the dome 4; an LED module 3 disposed on the base plate 2; and a light guide plate 1 that is disposed on the dome sheet 5. Such a configuration causes light emitted by the LED module 3 propagates within the light guide plate, and exits the light from an exit surface of the light guide plate on the key top 6 side. The light guide plate 1 is formed by inkjet printing a dot pattern in white ink onto a surface of a base material formed from a thermosetting polyurethane elastomer sheet, which surface is opposite to the exit surface of the light guide plate.

19 Claims, 11 Drawing Sheets

U.S. PATENT DOCUMENTS

| | | |
|---|---|---|
| 7,619,173 B2 * | 11/2009 | Inoue .......................... 200/310 |
| 7,677,781 B2 | 3/2010 | Ishihara et al. |
| 7,690,803 B2 | 4/2010 | Miyashita et al. |
| 7,706,050 B2 | 4/2010 | Sampsell |
| 7,884,295 B2 * | 2/2011 | Aoki et al. ................... 200/314 |
| 7,888,613 B2 * | 2/2011 | Jeffery et al. ................ 200/314 |
| 7,893,374 B2 * | 2/2011 | Aihara et al. ................ 200/314 |
| 7,947,915 B2 * | 5/2011 | Lee et al. ..................... 200/314 |
| 7,994,445 B2 * | 8/2011 | Aihara et al. ................ 200/314 |
| 8,110,765 B2 * | 2/2012 | Marcus et al. ............... 200/512 |
| 2006/0260922 A1 | 11/2006 | Lee et al. |
| 2008/0302642 A1 * | 12/2008 | Tatehata et al. ............. 200/317 |

FOREIGN PATENT DOCUMENTS

| | | |
|---|---|---|
| JP | 2006-324240 A | 11/2006 |
| JP | 2006323843 A | 11/2006 |
| JP | 2007-053063 A | 3/2007 |
| JP | 2007-084636 A | 4/2007 |
| JP | 2007-087749 A | 4/2007 |
| JP | 2007-527036 T | 9/2007 |
| JP | 2007-324100 A | 12/2007 |
| JP | 2008-060058 A | 3/2008 |
| JP | 2008-130506 A | 6/2008 |
| JP | 2008-243655 A | 10/2008 |
| WO | WO 2008/062714 A1 | 5/2008 |

* cited by examiner

KEY MODULE FOR MOBILE DEVICE

CROSS-REFERENCE TO RELATED APPLICATIONS

This application is a National Stage of International Application No. PCT/JP2009/054443, filed Mar. 9, 2009, which claims priority to Japanese Patent Application No. 2008-167474 filed Jun. 26, 2008, and Japanese Patent Application No. 2008-292658 filed Nov. 14, 2008. The entire disclosure of each of the above applications are incorporated herein by reference.

FIELD

The present invention relates to a key module having an illuminating function, which is incorporated in the operation panels of various portable electronic devices.

BACKGROUND

Figure 10:
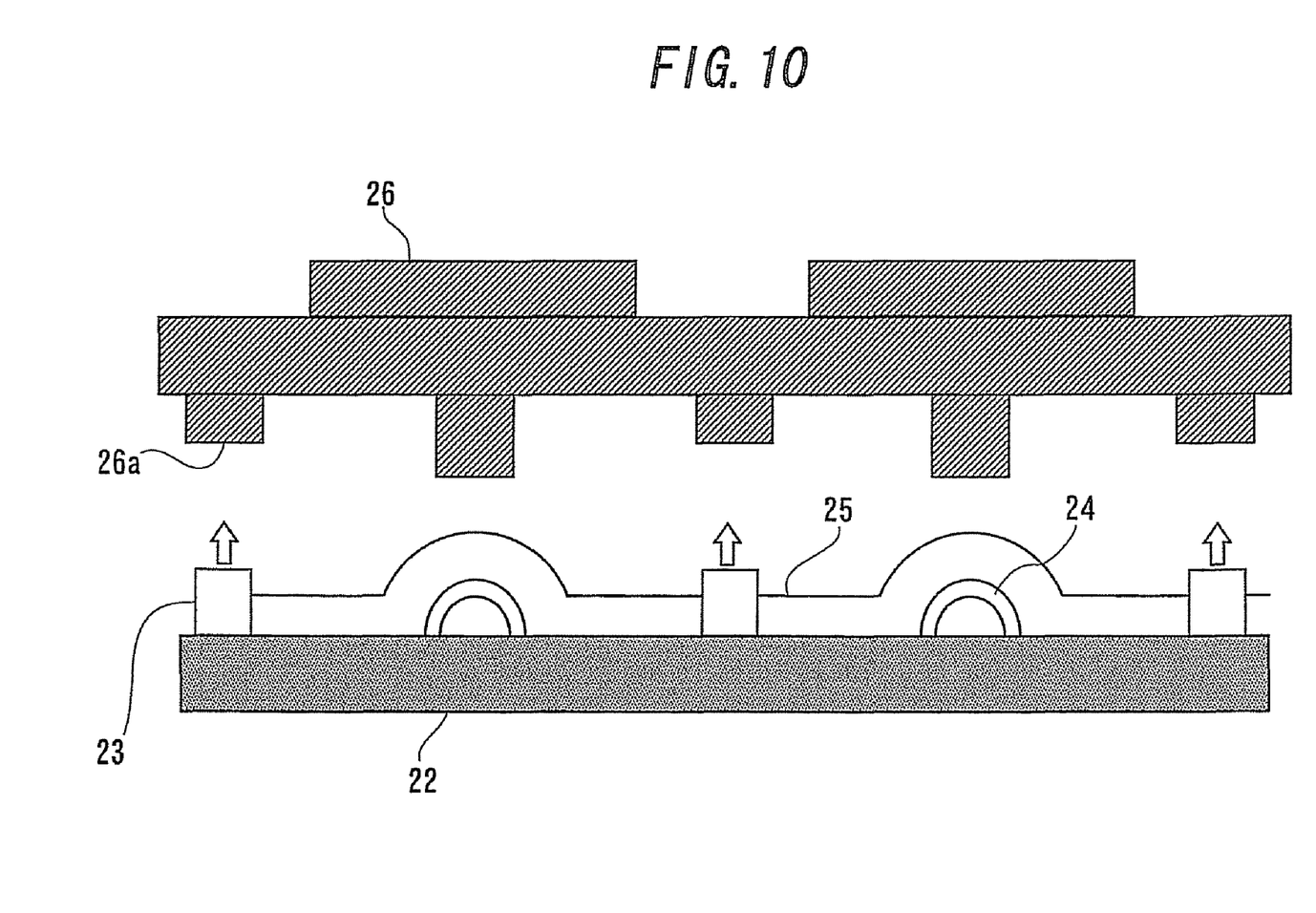
FIG. 10 is a view showing a first example of the configuration of a conventional key module of a mobile device.

Conventionally, in order to illuminate the key parts of a portable electronic device (hereinafter referred to as a portable device), a structure in which LEDs are mounted and point light emission is diffused by the key tops is used. FIG. 10 shows a first example of the configuration of the key module of a conventional mobile device. In this example, domes 24 are disposed below corresponding key tops 26 formed on a base plate 22. Each of the domes 24, when depressed by the corresponding key tops 26, deforms, electrically connects to a corresponding contact, and also imparts a predetermined clicking sensation. This dome 24 is fixed on the base plate more securely by its being covered by a dome sheet 25 from above. In addition, each LED module 23 is disposed between the domes 24 on the base plate 22. Disposed above the LED module 23 is a light incident part 26a for the corresponding key top 26. When the LED module 23 emits light, the light exiting from this LED module 23 is incident to the light incident part 26a and is diffused by the key top 26.

However, in this configuration, the light source is the LED module 23, which is a point light source, and the uniformity of luminance is low, leading to inconveniences, such as poor visibility. Such a configuration also suffers from the problem that an increase in the number of LED modules 23 increases costs and power consumption.

Figure 11:
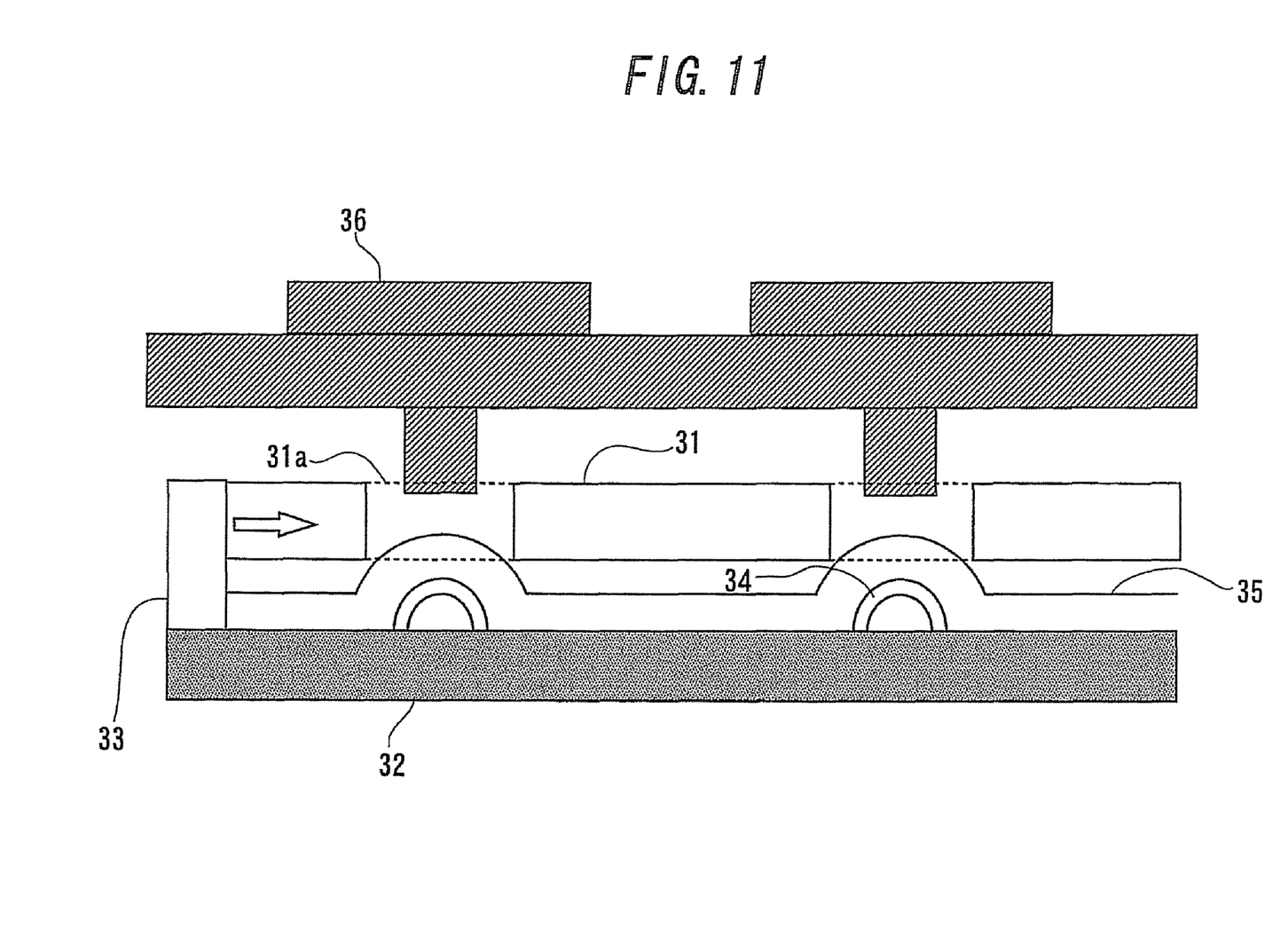
FIG. 11 is a view showing a second example of the configuration of a conventional key module of a mobile device.

To overcome such problems, a configuration has been proposed, as in an example shown in FIG. 11, in which a light guide plate 31 is disposed between a dome sheet 35 and a key top 36, incident light from an LED module 33 enters from a side of the guide light plate 31, and exits from the surface of the light guide plate 33 as surface light. This makes it possible to reduce the number of LED modules 33, improve the uniformity of luminance, and facilitate the visibility of characters on each key top 36.

However, a conventional light guide plate 31 is formed by molding acrylic resin or polycarbonate, which makes it difficult to reduce the thickness of the light guide plate. A thicker light guide plate 31 makes it more difficult for the plate 31 to follow the recesses and projections of the dome sheet 35, with the result that clicking sensation is not obtained when the keys are operated. Accordingly, this example has a structure in which openings 31a are formed in parts of the light guide plate 31, which parts are near and above the domes 34, so that the key tops 36 come into contact with the dome sheet 35 directly. In such a structure, a large quantity of light propagating horizontally in FIG. 11 exits toward the key tops 35 from the end faces that define the openings 31a. Consequently, light does not reach the trailing end of the light guide plate 31, making it difficult to maintain uniformity of luminance.

Additionally, in the example shown in FIG. 11, assembly is inefficient and requires extra space, and incurs additional processing costs such as those for boring a hole in the light guide plate 31. This increases costs and hinders attempts to decrease thickness. A technique for decreasing thickness by employing a polycarbonate film as a light guide plate 31 has been developed. In this case, however, clicking sensation cannot be obtained due to the film's hardness; and improving clicking sensation by making the film thinner results in insufficient light incident to the film and hence a luminance decrease and loss of uniform luminance.

On the other hand, there is a technique for employing a flexible silicone rubber sheet for use as a light guide plate. The silicone rubber produces excellent clicking sensation compared to polycarbonate, but suffers from decreasing durability if the silicone rubber film is made thinner.

Further, there is a technique that uses a polyurethane sheet as a light guide plate. The polyurethane sheet is superior in clicking sensation to polycarbonate film of the same thickness and in durability to the silicone rubber sheet. Depending on a processing method, polyurethane may be categorized as thermosetting or thermoplastic type. Polyurethane for use as a light guide plate is of thermoplastic type that can easily be molded into a sheet. Various materials may be added to the thermoplastic polyurethane in order to improve its moldability. However, this makes the thermoplastic polyurethane inferior in oil resistance to thermosetting polyurethane; moreover, thermoplastic polyurethane shrinks or deforms due to heat, making it difficult to use where heat resistance is required. Such a characteristic of thermoplastic polyurethane does not favor its use in an optical film that requires reliability, as in the present invention.

Patent Document 1: Japanese Patent Application Laid-Open 2007-53063
Patent Document 2: Japanese Patent Application Laid-Open 2007-87749
Patent Document 3: Japanese Patent Application Laid-Open 2001-167655
Patent Document 4: Japanese Patent Application Laid-Open 2007-324100
Patent Document 5: Japanese Patent Application Laid-Open 2008-243655

SUMMARY

It is accordingly an object of the present invention to provide a key module for a mobile device, the key module being designed to be thinner, have higher luminance and higher uniformity of luminance, and produce a satisfactory clicking sensation.

The most significant feature of the present invention is as follows: a light guide plate disposed in a space between a dome sheet and a key top is formed by inkjet printing a dot pattern in white ink onto the dome sheet side face of a base material formed from a thermosetting polyurethane elastomer sheet.

Specifically, there is provided a key module for a mobile device including: a key top part that is depressed by an operator, thereby inputting a signal; a base plate on which a fixed-side contact for generating the signal is disposed; a movable-side contact that is disposed on the key top part side of the fixed-side contact and is depressed by the key top part, thereby deforming and connecting to the fixed-side contact and generating the signal; a movable-side contact sheet that covers the movable-side contact in order to fix the movable-side contact on the base plate; and a light guide plate that is disposed on the key top part side of the movable-side contact sheet, causes light emitted by a light source, disposed on a side of the light guide plate, to propagate within the light guide plate, and exits the light from an exit surface of the light guide plate on the key top part side, the key module being characterized in that: the light guide plate is formed by inkjet printing a dot pattern in white ink onto a surface of a base material formed from a thermosetting polyurethane elastomer sheet, which surface is opposite to the exit surface of the light guide plate.

This makes it possible to further decrease the thickness of the light guide plate and hence the mobile device. In addition, this obviates the need to form an opening above the dome, yielding higher luminance and higher uniformity thereof. Further, since this makes it possible to render the light guide plate highly flexible, a satisfactory clicking sensation can be obtained even in a configuration in which the dome is pressed by the key top via a light guide plate.

Further, according to the present invention, light can be emitted into the thermosetting polyurethane elastomer sheet from a side surface of the sheet by an LED module. This makes it possible to reduce the number of LED modules and hence costs.

In addition, using a thermosetting polyurethane elastomer sheet as the base material for the light guide plate, even if it is made thicker, yields a more satisfactory clicking sensation compared to other materials. Additionally, use of this sheet in a mobile device ensures adequate mechanical and environmental resistance. Furthermore, the flexibility of the thermosetting polyurethane elastomer sheet enables the light guide plate to be disposed in a limited space of complex shape of the mobile device, thus increasing freedom in mobile device design.

In the present invention, the Shore A hardness of the base material may be 90 or greater. This ensures a durability adequate for use in a key module. Specifically, the Shore A hardness of the base material may be 98 or below. This produces a clicking sensation adequate for use in a key module. Also, the thickness of the base material may be 0.05 mm or greater. This ensures the required ability to guide light. Further, it is preferable that the thickness of the base material be 0.15 mm or greater because this more easily yields a more uniform surface light. Furthermore, the thickness of the base material may be 025 mm or less. Where the base material satisfies these conditions, a satisfactory clicking sensation is more securely available.

The present invention may be a key module for a mobile device including: a key top part that is depressed by an operator, thereby inputting a signal; a base plate on which a fixed-side contact for generating the signal is disposed; a movable-side contact that is disposed on the key top part side of the fixed-side contact and is depressed by the key top part, thereby deforming and connecting to the fixed-side contact and generating the signal; and a light guide plate that is disposed on the key top part side of the movable-side contact, causes light emitted by a light source, disposed on a side of the light guide plate, to propagate within the light guide plate, and exits the light from an exit surface of the light guide plate on the key top part side, the key module being characterized in that: the light guide plate is formed by inkjet printing a dot pattern in white ink onto a surface of a base material formed from a thermosetting polyurethane elastomer sheet, which surface is opposite to the exit surface of the light guide plate, and the light guide plate is disposed so as to cover the movable-side contact directly.

That is, the light guide plate formed by inkjet printing a dot pattern in white ink onto a surface of the base material formed from a thermosetting polyurethane elastomer sheet, which surface is opposite to the exit surface of the light guide plate, is highly flexible. Accordingly, a movable-side contact may be fixed to the base plate by the light guide plate, thereby functioning as a movable-side contact sheet as well.

This obviates the need for a separate movable-side contact sheet, thus reducing the number of components and costs. Additionally, omitting a separate movable contact sheet yields a sufficient clicking sensation.

In this case, the Shore harness A of the base material may be 90 or less. That is, greater flexibility of the light guide plate increases adhesion to the movable-side contact, thereby allowing the latter to function as the movable-side contact sheet more reliably. It is preferable that the Shore A hardness of the base material be 60 or greater. This yields a durability appropriate for use in the key module of a mobile device. In the case where the movable-side contact is held only by the light guide plate, it is preferable that the base material have a Shore A hardness of 80 or greater.

In the present invention, white ink is UV curing white ink and may be bonded to the base material by its being UV cured. This reduces the time taken for a dot pattern in white ink to dry in the process of manufacturing the light guide plate, improving productivity. In addition, changes in shape, thickness, etc. during the drying of the dot pattern can also be suppressed.

The foregoing means may also be used in any possible combination.

A key module for a mobile device according to the present invention is thinner, has higher luminance and higher uniformity of luminance, and yields a satisfactory clicking sensation.

DETAILED DESCRIPTION

Example embodiments will now be described more fully with reference to the accompanying drawings.

Embodiments according to the present invention will hereinafter be described with reference to the accompanying drawings.

Figure 1:
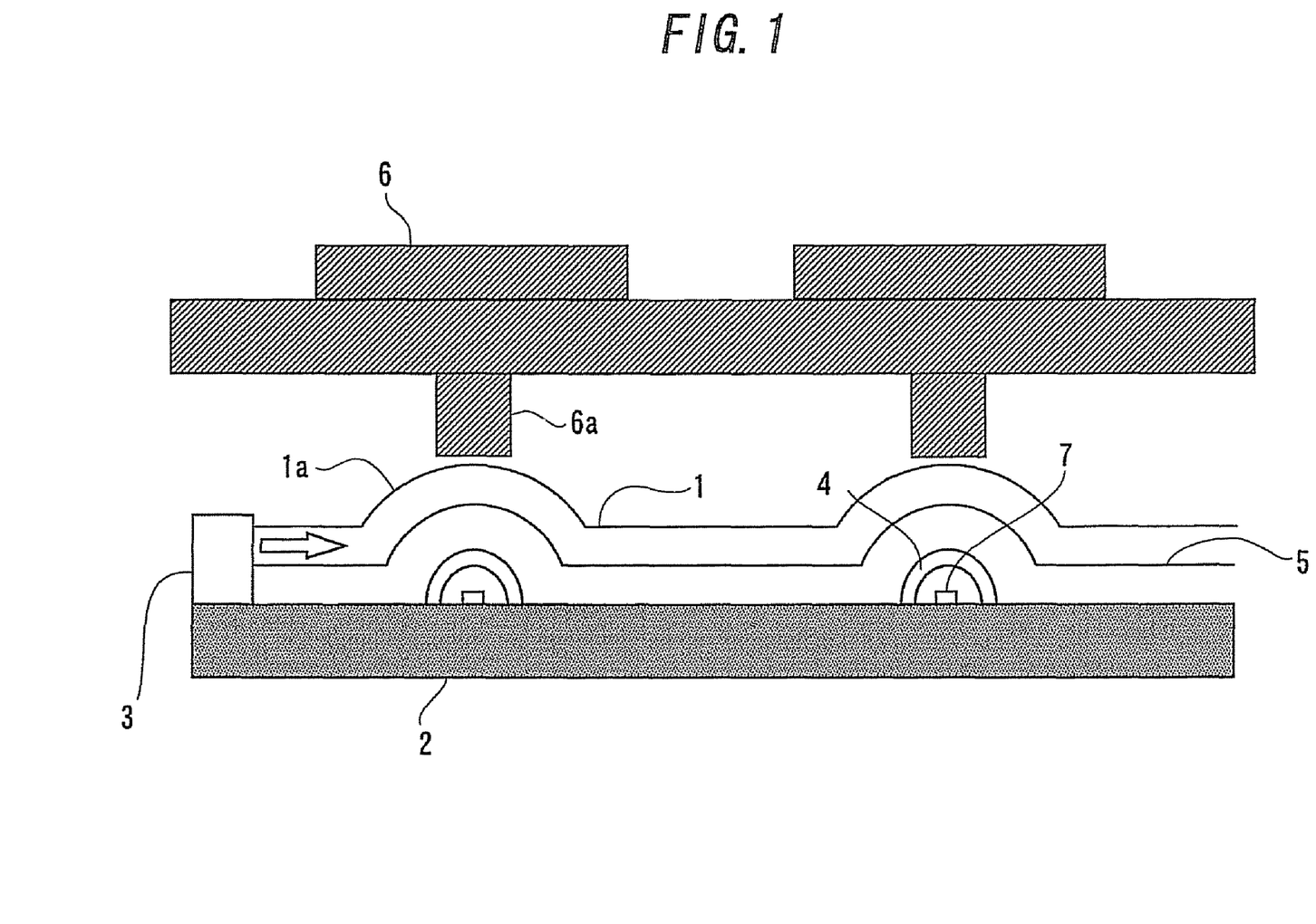
FIG. 1 is a view showing the configuration of a key module for a mobile device according to the first embodiment of the present invention.

FIG. 1 shows the configuration of a key module according to the present invention. In the key module in the present invention, disposed on a base plate 2 are fixed-side contacts 7 used for generating signals produced by operating the keys. When an operator depresses a key on a key top 6 serving as a key top part, a pressing part 6a moves downward in conjunction with the key movement. Disposed below the pressing part 6a is a dome 4, serving as a movable-side contact, which is depressed by the pressing part 6a, thereby deforming and electrically connecting to the fixed-side contact 7 while imparting a clicking sensation.

In addition, the key module has a dome sheet 5, serving as a movable-side contact sheet, which fixes the dome 4 onto the base plate 2 and so covers the base plate 2 and dome 4. Further, a light guide plate 1 is disposed between the dome sheet 5 and the key top 6. In the present embodiment, light is emitted into a side of the light guide plate 1 by an LED module 3, which serves as a light source. This light is emitted as surface light from the surface (i.e., key top 6 side surface) of the light guide plate 1. In the present embodiment, a dome receiving portion 1a in the shape of an outward projection as viewed from the key top 6 side is formed in the light guide plate 1 in an area that is on the pressing part 6a side of the dome 4, and no opening is formed in the dome receiving portion 1a.

The light guide plate 1 is formed by inkjet-printing a dot pattern in white ink on the back (i.e., the dome 4 side face) of a thin thermosetting polyurethane elastomer sheet, which serves as a base material.

Figure 2A:
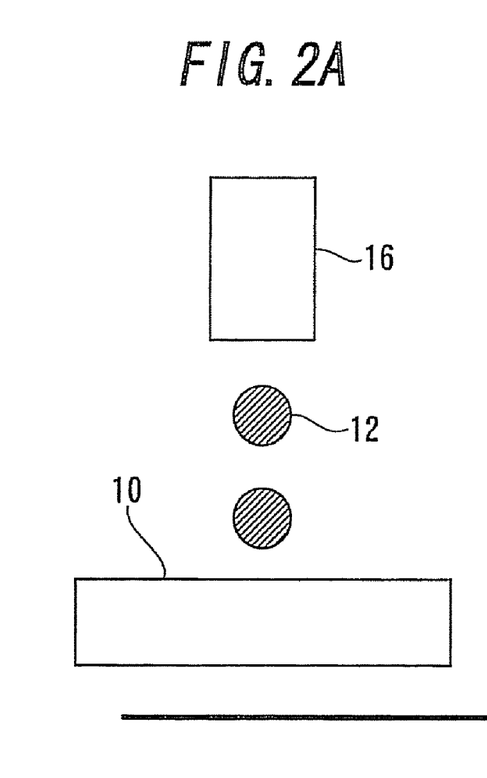
FIGS. 2A to 2C illustrates steps of manufacturing a light guide plate according to this embodiment of the present invention.
Figure 2B:
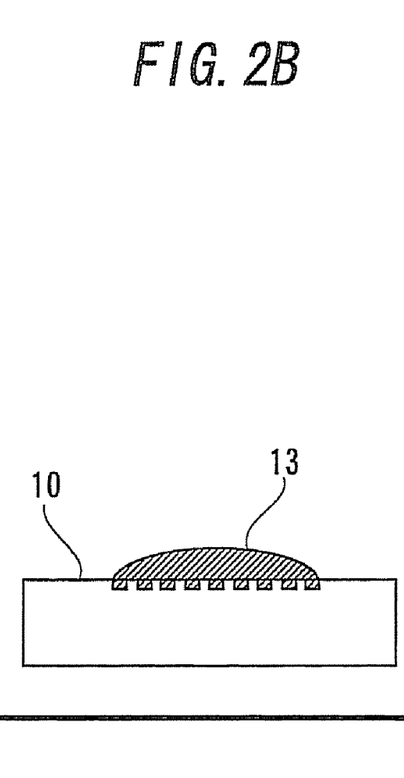
Figure 2C:
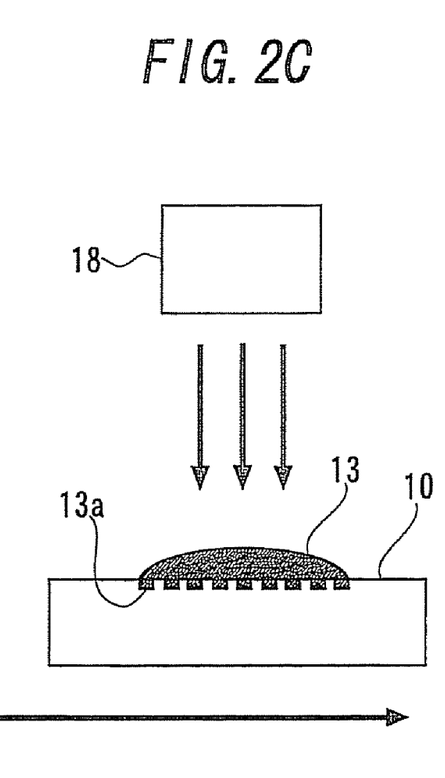

FIGS. 2A-2C illustrate schematic views of a manufacturing process for the light guide plate 1 according to the present embodiment. In FIGS. 2A-2C, a thermosetting polyurethane elastomer sheet is selected as a base material 10 for the light guide plate. Additionally, on account of the base material 10, a composition (in the present embodiment, the main constituent is 70 to 90 (inclusive) wt % photopolymerization composition, pigment is 10 to 20 (inclusive) wt % titanium dioxide, and the remainder is 5 wt % or less polymerization initiator) for the white ink is selected, which imparts a sufficiently high swelling tendency to the ink. Dot printing with the white ink is carried out by an inkjet method in which droplets of the white ink 12 are jetted from an inkjet head 16, as shown in FIG. 2A.

Consequently, as shown in FIG. 2B, the white ink enters and disperses in the base plate 10 in the boundary between the base plate 10 and the white ink dot 13 projected onto the base plate 10. In this condition, UV light is emitted onto the white ink 13 by a UV curing device 18, as shown in FIG. 2C, thereby curing the white ink 13. As a result, the white ink dot 13 itself cures, and the white ink that has entered and dispersed in the base plate also cures, thereby forming a strong bonding portion 13a. Thus, the adhesion and bonding strength between the white ink dot 13 and the base material 10 can be increased.

Figure 3:
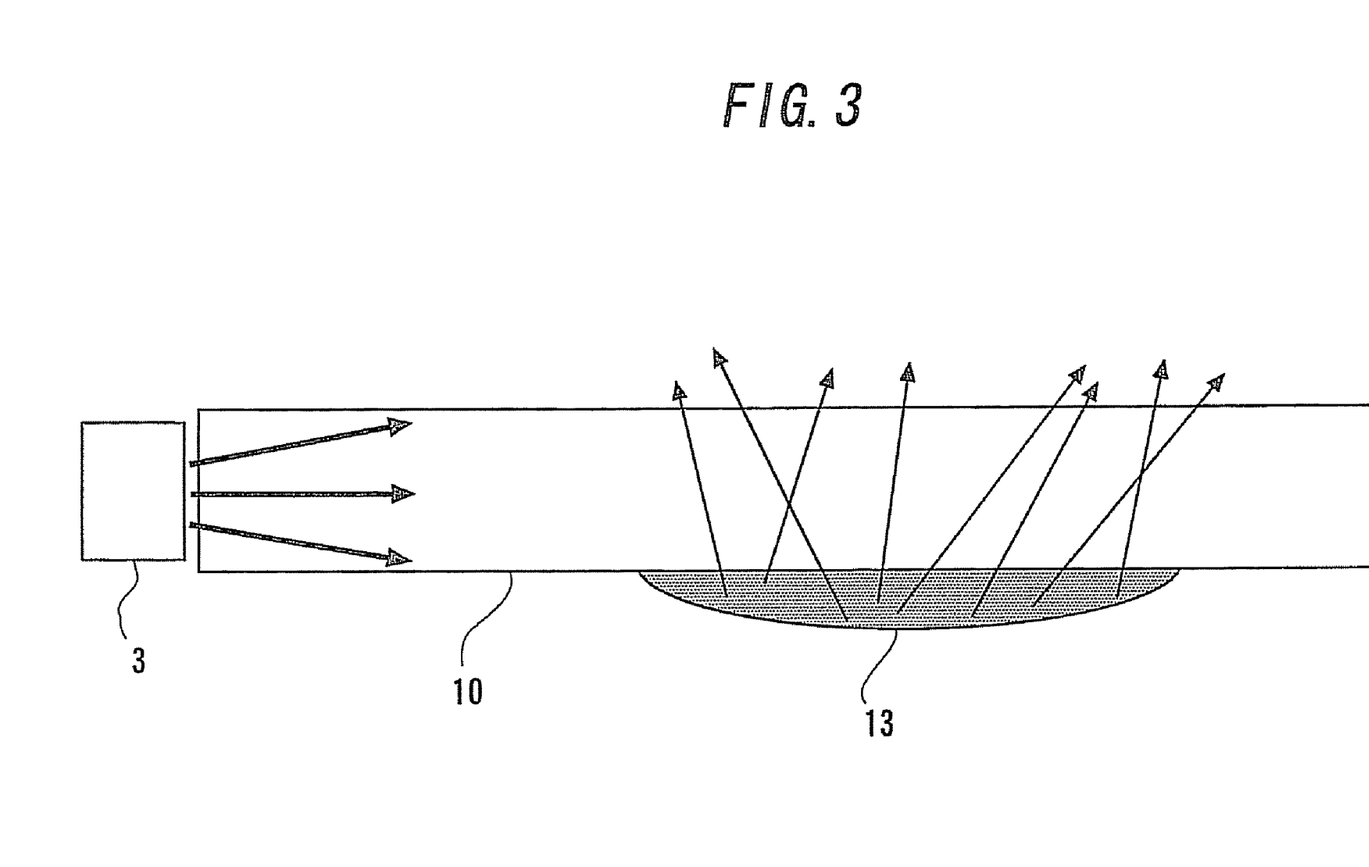
FIG. 3 is a view for explaining the action of a light guide plate according to this embodiment of the present invention.

Next, the action of a light guide plate produced as shown in FIGS. 2A-2C will be described briefly with reference to FIG. 3. As shown in FIG. 3, light is made incident to the base material 10 of the light guide plate from a side of the base material 10 by the LED module 3. This light incident to the base material 10 propagates within the base material 10, and some starts to exit the rear of the base material 10. The light starting to exit the rear is, however, scattered by the pigment in the white dot 13 or reflected by the boundary surface between the white ink dot 13 and the outside, and consequently exits from the top of the base material 10. As a result, incident light from the LED module 3 can be made to exit uniformly from the top of the base material 10 by a dot pattern of white ink dots 13.

As described above, the present embodiment uses an inkjet method. This makes it possible to precisely adjust the quantity of droplets of white ink 2 and hence to precisely control the diameter and thickness of the white ink dot 3 on the base material 1.

In addition, the inkjet method allows a high degree of freedom in image formation and easy alteration, thus enabling dot pattern formation with a high degree of freedom. In addition, since the time required for pattern formation or alteration can be reduced, time for completion can also be greatly shortened.

Further, in the present embodiment, since the white UV curing ink is used as white ink, the white ink dot 13 can be cured by UV radiation immediately after the dot is formed on the base material 10 by the inkjet method. This makes it possible to suppress changes in the planar shape, thickness, and cross-sectional shape of a dot. Furthermore, productivity is improved by a shortened drying time.

In the present embodiment, the thermosetting polyurethane elastomer sheet is used as a material for the base material 10. This makes it easy to attach the base material 10 to a curved face or member surface with recesses and/or projections, thus easily satisfying any requirement for a light guide plate to be fitted in a limited space of complex shape, as in the inside of a mobile phone.

Measurement Example 1

Next will be described Measurement Example 1 for the present embodiment. In this measurement example, a key module according to the present invention is used in a key part of a cell phone to evaluate clicking sensation, which is a significant cell phone characteristic. In the measurement, thermosetting polyurethane elastomer sheets with a thickness of 200 μm, 220 μm, or 240 μm and the respective Shore A hardnesses of 91 or 97 are used as base materials 10. Comparison is also made between a measurement where a light guide plate is not used and a measurement where polycarbonate and polyester are each used as a base material 10 for the light guide plate. As printing ink, white UV curing ink A (the main constituent is 70 to 90 (inclusive) wt % of photopolymerization composition, pigment is 10 to 20 (inclusive) wt % of titanium dioxide, and the remainder is 5 wt % or less of polymerization initiator) is used. As an inkjet head 6, a piezotype is used under conditions of 360 dpi and 14 pl droplet. As a UV curing device, Subzero (manufactured by Integration Inc.) is used.

Figure 4:
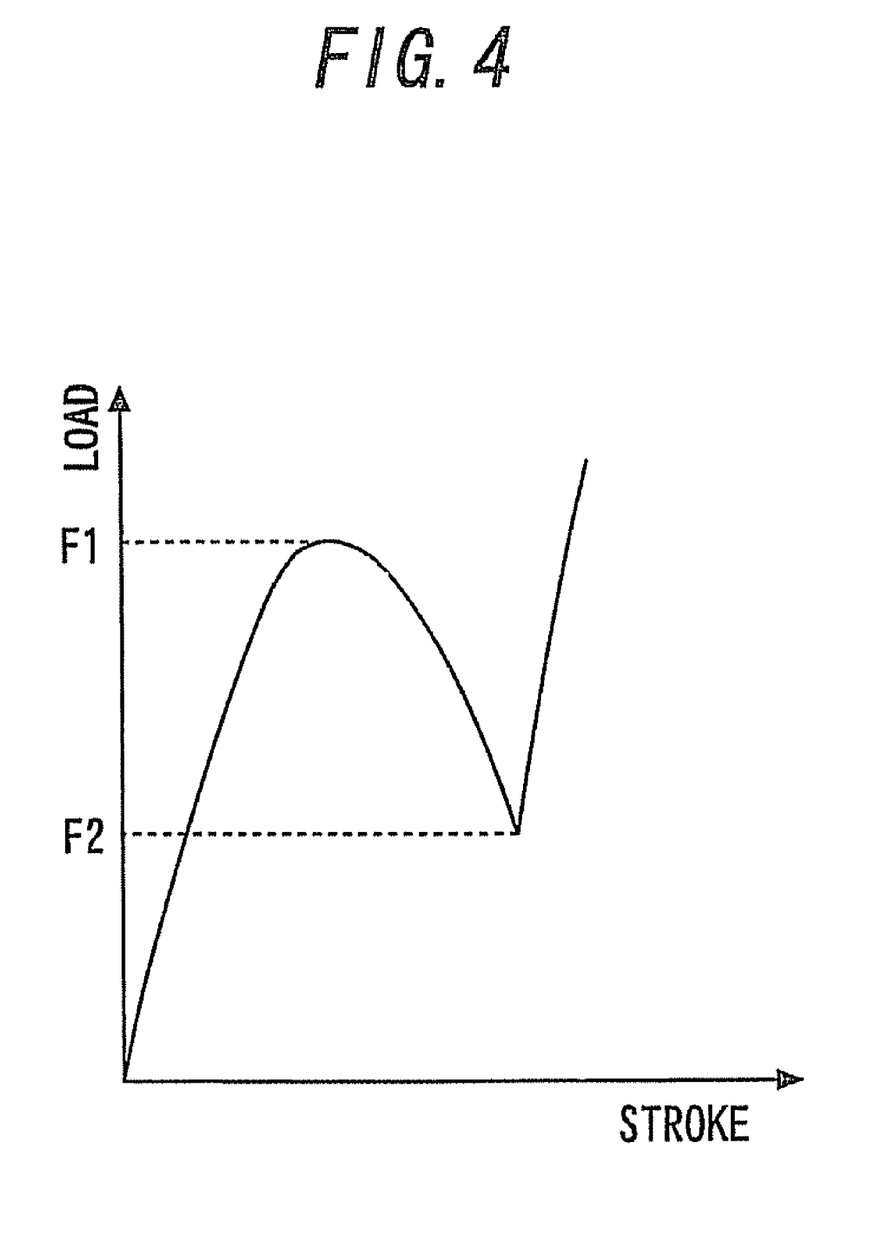
FIG. 4 is a view for explaining a clicking ratio according to the present invention.

Clicking sensation is evaluated by calculating and comparing clicking ratio. When an operator presses a regular key top 6, its load changes as shown in FIG. 4. The clicking ratio in the change in load shown in FIG. 4 is defined by the formula expressed below.

$$\text{Clicking ratio} = (F1 - F2)/F1 \qquad (1)$$

Generally, an adequate clicking ratio will be not less than 20% to 25%.

Table 1 shows the result of the measurement example.

TABLE 1

| TYPE OF LIGHT GUIDE PLATE | CLICKING RATIO |
|---|---|
| BLANK (LIGHT GUIDE PLATE IS NOT USED) | 35% |
| THERMOSETTING POLYURETHANE ELASTOMER SHEET (SHORE A HARDNESS 91) t = 0.20 mm | 32% |
| THERMOSETTING POLYURETHANE ELASTOMER SHEET (SHORE A HARDNESS 97) t = 0.20 mm | 31% |
| THERMOSETTING POLYURETHANE ELASTOMER SHEET (SHORE A HARDNESS 97) t = 0.22 mm | 29% |
| THERMOSETTING POLYURETHANE ELASTOMER SHEET (SHORE A HARDNESS 97) t = 0.24 mm | 28% |
| POLYCARBONATE t = 0.18 mm | 17% |
| POLYESTER t = 0.19 mm | 6% |

As found from the measurement result, the clicking ratio of polyester and polycarbonate increase as they become thinner. However, where the polyester and polycarbonate are substantially equal in thickness to the thermosetting polyurethane elastomer sheet, their clicking ratio do not reach 20%. On the other hand, where a thermosetting polyurethane elastomer sheet is used, a sufficient clicking sensation is obtained even if its thickness is as great as 240 μm. As the thermosetting polyurethane elastomer sheet becomes thinner, clicking sensation increases and reaches that percentage obtained where a light guide plate is not used. From these results, it is clear that if the Shore A harness of the thermosetting polyurethane elastomer sheet is at least in the range of 90 to 98 inclusive and its hardness is 0.25 mm or less, an adequate clicking ratio can be securely obtained.

As just described above, it is apparent that a thermosetting polyurethane elastomer sheet characteristically makes clicking sensation less likely to degrade compared to other materials. Accordingly, this makes it possible to decrease the thickness of the thermosetting polyurethane elastomer sheet, thus obtaining a higher clicking sensation than with other materials. In addition, the thicker the light guide plate 1 becomes, more efficiently does light enter from the LED module 3, and the higher the luminance becomes. Accordingly, since the thermosetting polyurethane elastomer sheet has the advantage of improving luminance, it is more favored than other materials. When ease of entry of light from the side of the light guide plate 1 is taken into account, it is preferable, in the present embodiment, that the thermosetting polyurethane elastomer sheet be in the range of 0.05 mm to 0.25 mm inclusive.

Measurement Example 2

Next will be described Measurement Example 2. In this measurement example, a key module according to the present invention is used in a key part of an actual mobile phone and a keystroke test is conducted under the following conditions: pressing load is 600 g; the rubber hardness of the end of a striking point is 65; and weighing speed is 5 mm/min. Thermosetting polyurethane elastomer sheets with a thickness of 200 μm, and a Shore A hardness of 91 or 97 are used as base materials 10. For comparison, measurement without use of a light guide plate is also conducted. Keystroke parts with respective diameters of ϕ15 mm and ϕ4 mm are used. The measurement results are shown in table 2.

TABLE 2

| TYPE OF LIGHT GUIDE PLATE | CLICKING RATIO |
|---|---|
| BLANK (LIGHT GUIDE PLATE IS NOT USED) | 35% |
| THERMOSETTING POLYURETHANE ELASTOMER SHEET (SHORE A HARDNESS 97) t = 0.20 mm KEY STROKE PARTϕ15 0→1 MILLION TIMES | 34%→32% |
| THERMOSETTING POLYURETHANE ELASTOMER SHEET (SHORE A HARDNESS 97) t = 0.20 mm KEY STROKE PARTϕ4 0→1.5 MILLION TIMES | 32%→29% |
| THERMOSETTING POLYURETHANE ELASTOMER SHEET (SHORE A HARDNESS 91) t = 0.20 mm KEY STROKE PARTϕ15 0→0.75 MILLION TIMES | 33%→33% |

As shown in table 2, all the tested types showed almost no changes in clicking ratio before and after the keystroke test, and there was no degradation in mechanical characteristics. There were no changes in obtained luminance either. It was confirmed that while optical performance as excellent as with a light guide plate was maintained, adequate clicking sensation and high durability were acquired.

Figure 5:
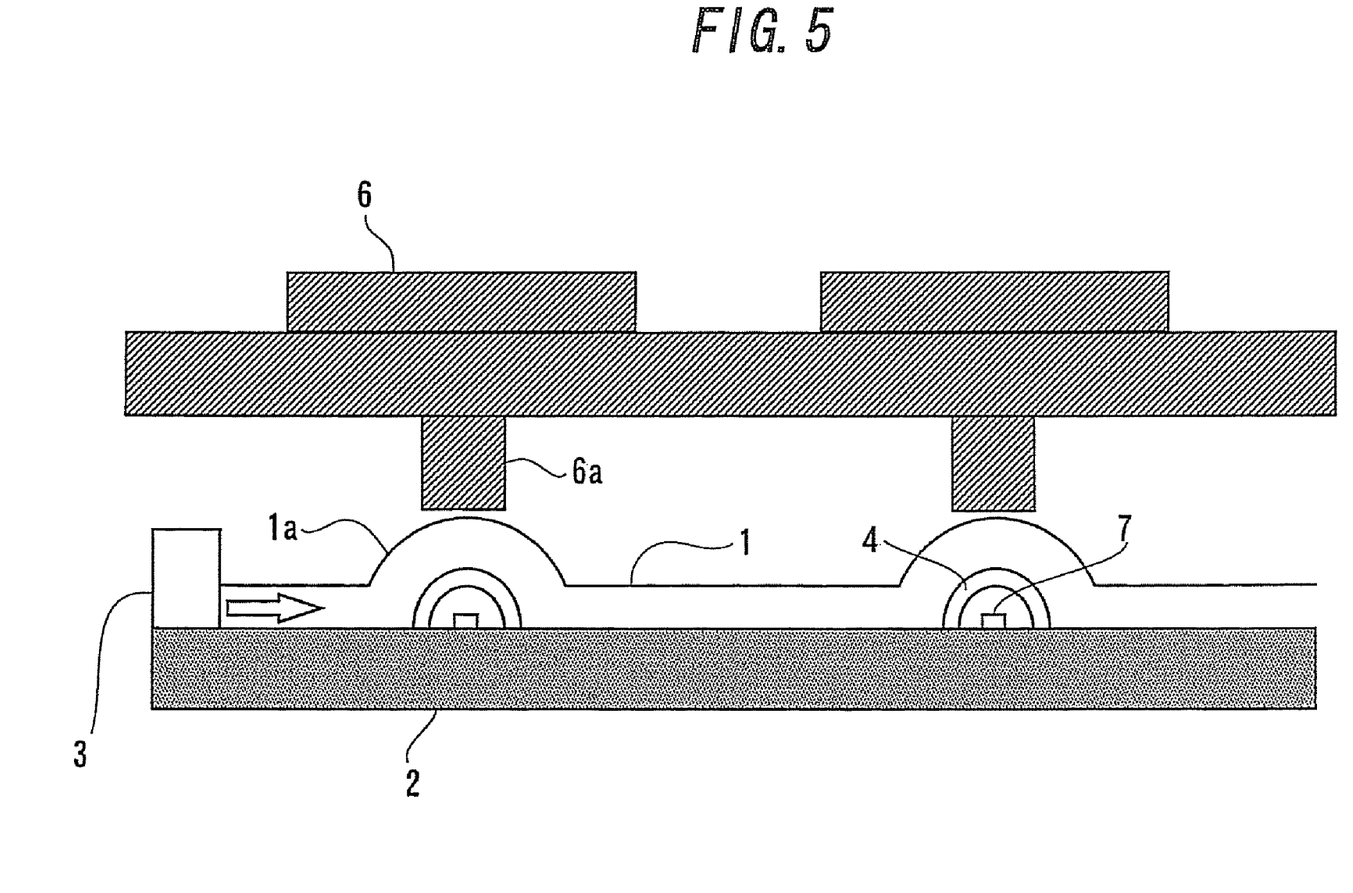
FIG. 5 is view showing the configuration of a key module for a mobile device according to the second embodiment of the present invention.

Next will be described a second embodiment. FIG. 5 shows the configuration of a key module according to the present invention. In the key module of the present invention, as in the first embodiment, disposed on a base plate 2 are fixed-side contacts 7 that generate signals produced by key operation. When an operator depresses a key on a key top 6 serving as a key top part, a pressing part 6a moves downward with the key movement. Disposed below the pressing part 6a is a dome 4, serving as a movable-side contact, which is depressed by the pressing part 6a, thereby deforming and electrically connecting to the fixed-side contact 7 and imparting clicking sensation.

Additionally, in the present embodiment, a light guide plate 1 is disposed so as to fix a dome 4 onto a base plate 2 by covering the base plate 2 and the dome 4 directly (without a dome sheet). In the present embodiment, light is emitted into a side of the light guide plate 1 by an LED module 3, which serves as a light source. This light exits as surface light from the top (i.e., key top 6 side surface) of the light guide plate 1. Also in this embodiment, a dome receiving part 1a in the form of an outward projection as viewed from the key top 6 side is formed in the light guide plate 1 in an area that is in contact with the dome 4.

As in the first embodiment, the light guide plate 1 is formed by inkjet-printing a dot pattern in white ink on the back (i.e., the dome 4 side face) of a thin thermosetting polyurethane elastomer sheet, which serves as a base material.

In this configuration, the flexible light guide plate 1 fixes the dome 4 onto the base plate 2 directly without use of a dome sheet, thus making it possible to reduce a thickness of the entire key module. Additionally, a stronger clicking sensation is obtained.

Figure 6:
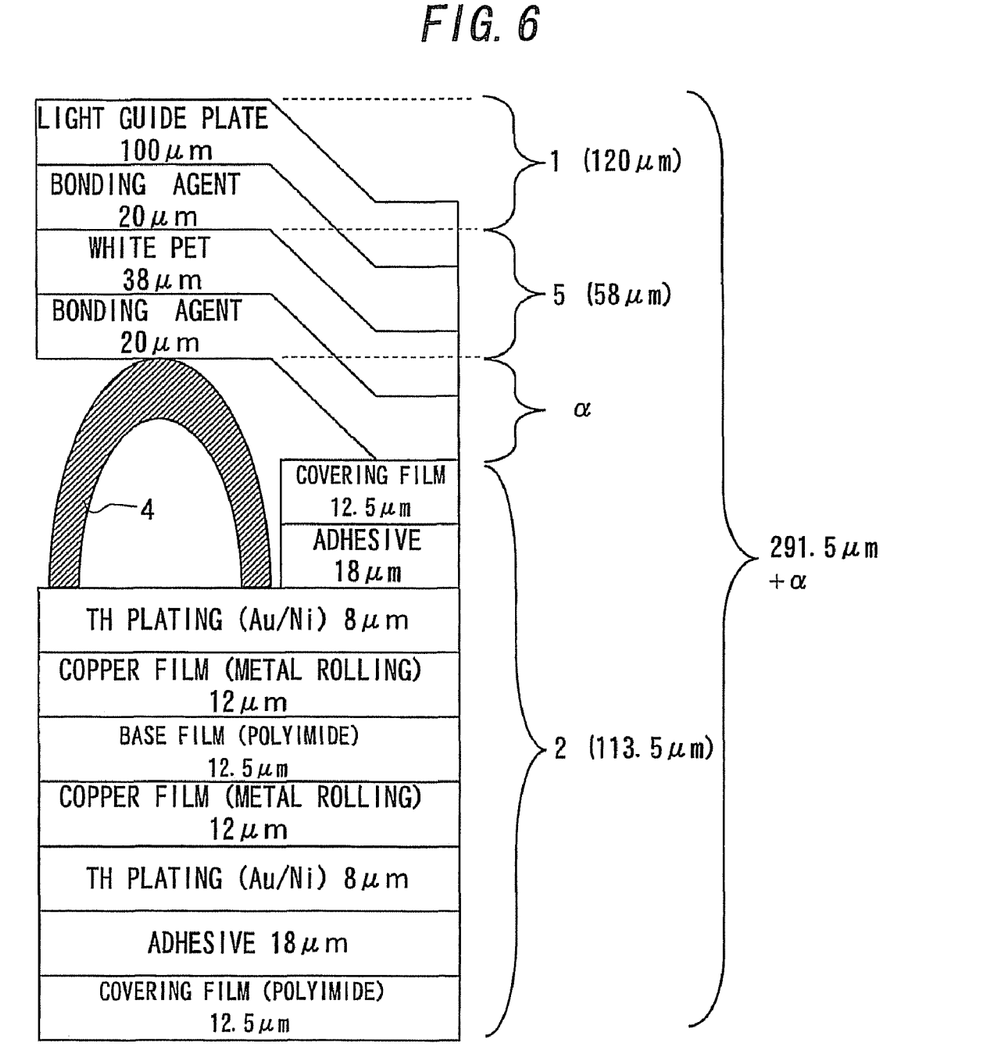
FIG. 6 is a view illustrating the height determined by a base plate, dome, dome sheet, and light guide plate according to the first embodiment of the present invention.

To compare with the present invention, FIG. 6 illustrates the height of the key module shown in FIG. 1 that is determined by the base plate 2, dome 4, dome sheet 5, and light guide 1. Here, the total thickness of the base plate 2 is 113.5 μm. However, the dome 4 is located in an area where a covering film and adhesive are absent from the upper edge of the base plate 2. Accordingly, the height where height α, acquired by subtracting the thickness of the covering film and adhesive from the height of the dome 4, is added to the base plate 2, is the height from the lower edge of the base plate 2 to the upper edge of the dome 4. Additionally, the dome sheet 5 with the thickness of 58 μm including bonding agent and the light guide plate 1 with the thickness of 120 μm including bonding agent are shown as added to the thickness of the dome 4. That is, the total thickness from the lower edge of the base plate 2 to the upper edge of the dome receiving part 1a of the light guide plate 1 is 291.15 μm+α.

Figure 7:
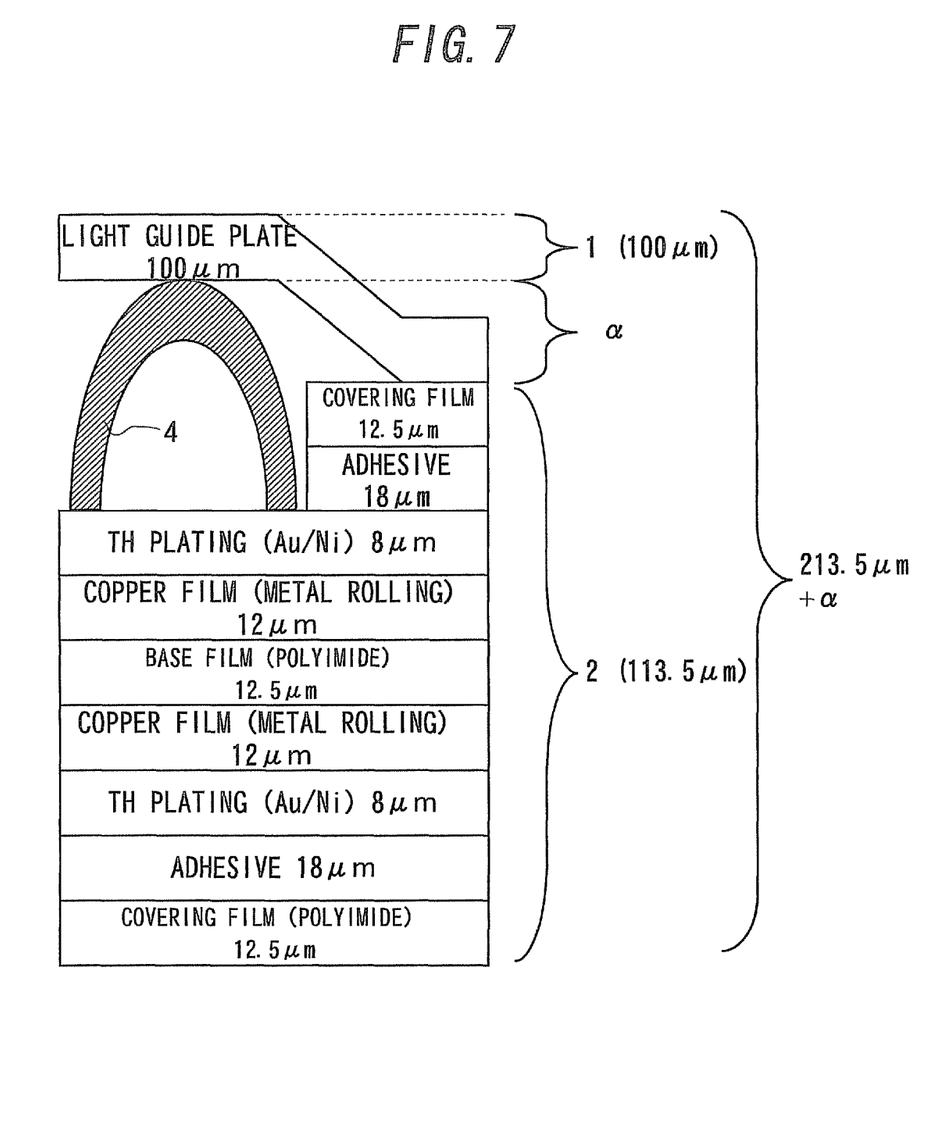
FIG. 7 is a view illustrating a first example of the height determined by a base plate, dome, and light guide plate according to the second embodiment of the present invention.

FIG. 7 illustrates the height of the key module according to the present invention as shown in FIG. 5 that is determined by the base plate 2, dome 4, and light guide 1. The total thickness of the base plate 2 is, as in FIG. 6, 113.5 μm. Also as in FIG. 6, the height where height α, acquired by subtracting the thickness of the covering film and adhesive from the height of the dome 4 is added to the thickness of base plate 2. In the present embodiment, the dome sheet 5 is not included and nor is a bonding agent applied to the light guide 1. Accordingly, only the 100 μm thickness of the light guide plate 1 is added to the thickness of the dome 4. Thus, the total thickness from the lower edge of the base plate 2 to the upper edge of the dome receiving part 1a of the light guide plate 1 is 213.5 μm+α. Bonding agent is not required for the light guide plate 1 because the surface of the thermosetting polyurethane elastomer sheet, which is the base material 10 of the light guide plate 1 in the present embodiment, is itself sticky and, accordingly, enables the positioning of the light guide plate 1 relative to the base plate 2 and the positioning of the dome 4 relative to the light guide plate 1 without a bonding agent.

Figure 8:
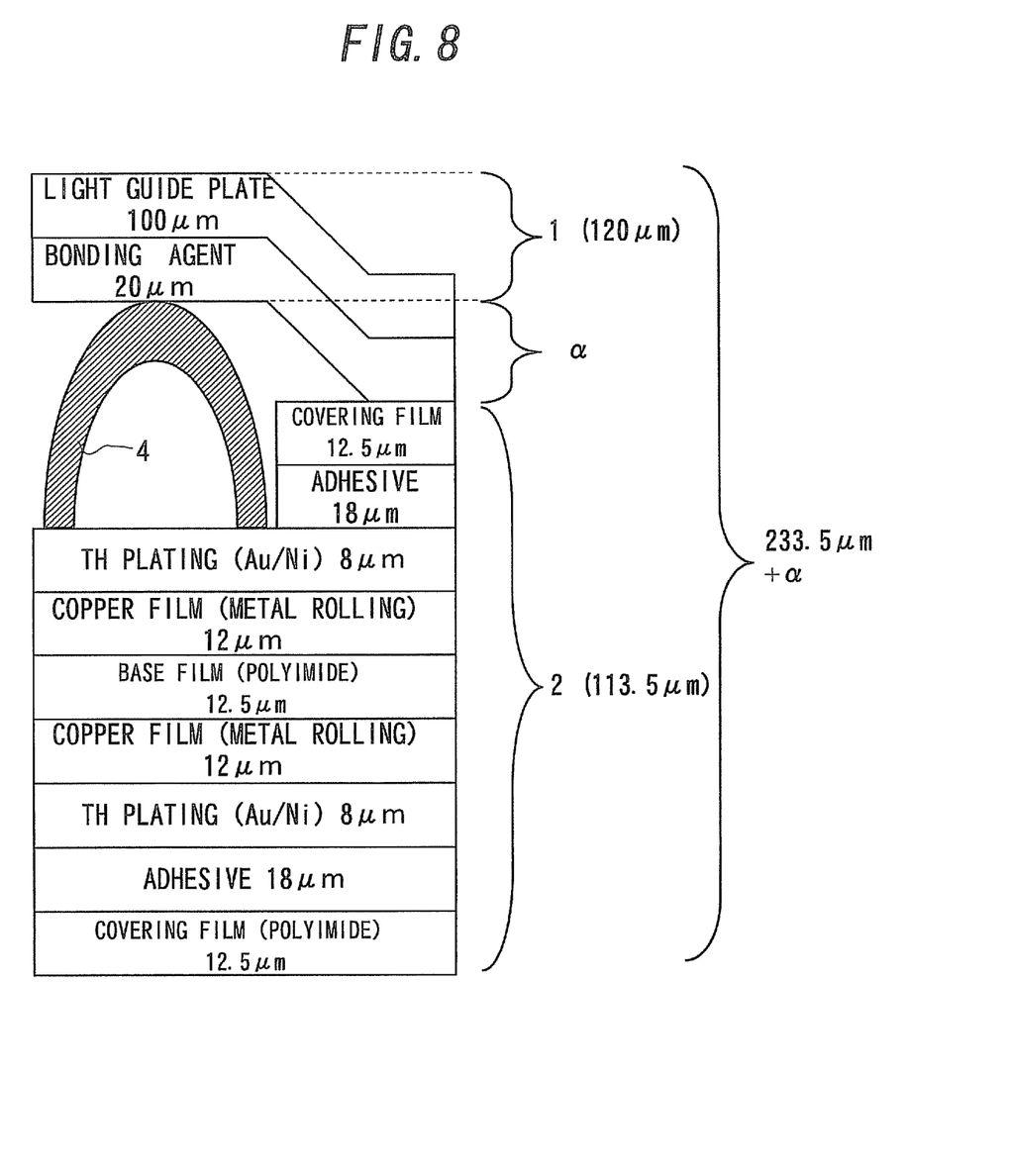
FIG. 8 is a view illustrating a second example of the height determined by a base plate, dome, and light guide plate according to the second embodiment of the present invention.

However, allowing for key module assembly and an operator's possibly over-vigorous key operation into consideration, a bonding agent may be applied to the light guide plate 1, as shown in FIG. 8. In this case, the thickness of the base plate 2 is, as in FIG. 6, 113.5 μm. Also as in FIG. 6, the height where height α acquired by subtracting the thickness of the covering film and adhesive from the height of the dome 4 is added to the thickness of base plate 2. The 120 μm thickness of the light guide plate 1 with a bonding agent applied thereto is shown as added to the thickness of the upper edge of the dome 4. That is, the total thickness from the lower edge of the base plate 2 to the upper edge of the dome receiving part 1a of the light guide plate is 233.5 μm+α.

Figure 9:
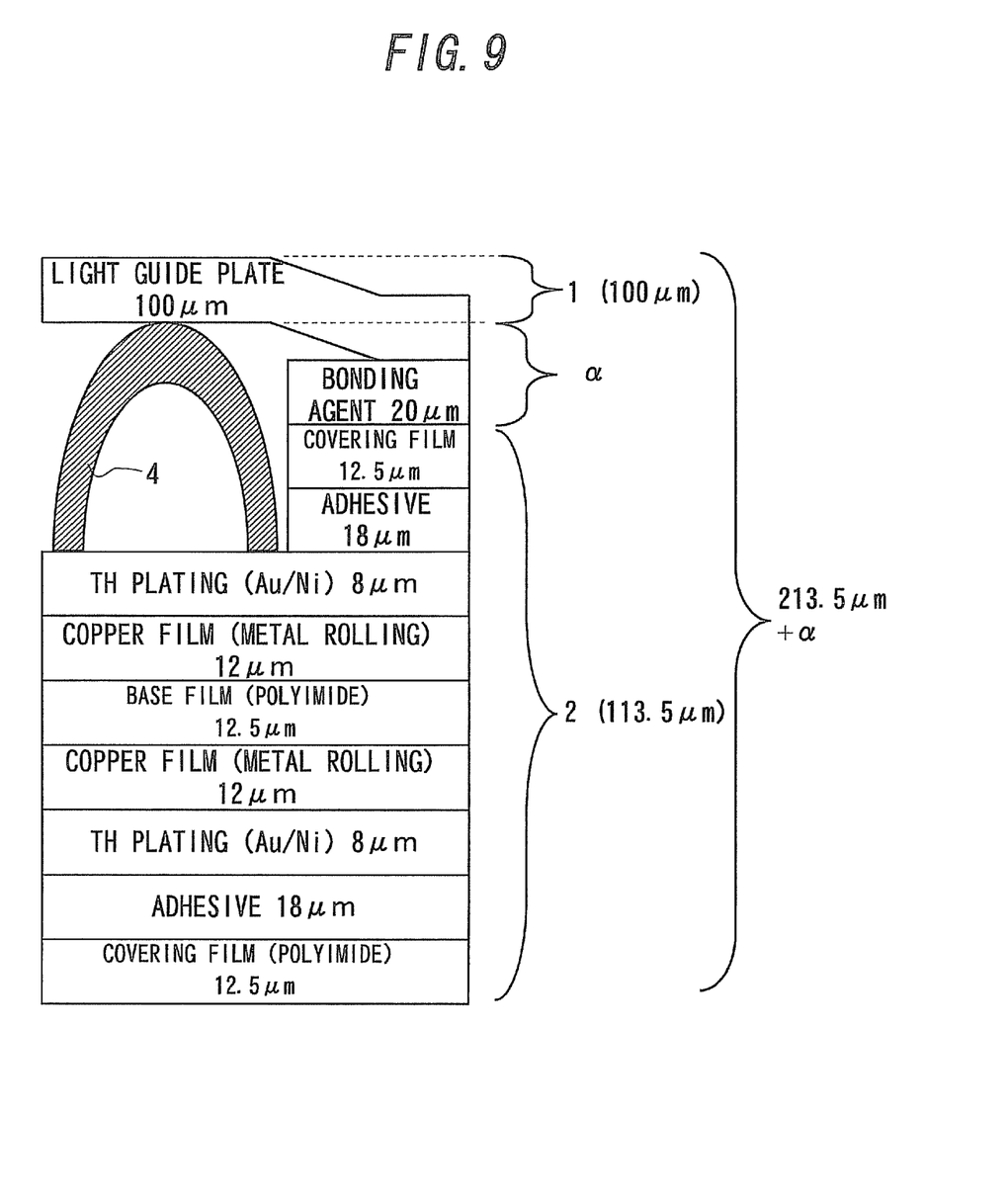
FIG. 9 is a view illustrating a third example of the height determined by a base plate, dome, and light guide plate according to the second embodiment of the present invention.

Alternatively, allowing for key module assembly and an operator's possibly over-vigorous key operation into consideration, a bonding agent may be applied to only that part of the light guide plate 1 which is not in contact with the dome 4, as shown in FIG. 9. In this case, only the 100 μm thickness of the light guide plate 1, from which the thickness of the bonding agent is subtracted, is shown as added to the thickness of the dome 4, as in FIG. 7. That is, the total thickness from the lower edge of the base plate 2 to the upper edge of the dome receiving part 1a of the light guide plate is 213.5 μm+α.

As described above, the present embodiment can limit the total thickness from the lower edge of the base plate 2 to the upper edge of the dome receiving part 1a of the light guide plate 1 by omitting the dome sheet 5. This makes it possible to make the entire key module thinner.

Measurement Example 3

Next will be described Measurement Example 3 according to the present invention. In the present embodiment, clicking sensation obtained from application of the configuration according to the present embodiment is evaluated. In the present embodiment, thermosetting polyurethane elastomer sheets with a thickness of 100 μm, and a Shore A hardness of 90 or 73 are used as base materials 10, and a dome sheet 5 is omitted. For comparison, polycarbonate with a thickness of 100 μm is used as a base material 10, and the case where the dome sheet 5 is included is also measured. The printing ink, inkjet head 6 and setting contents, and UV curing device are identical to those in Measurement Example 1. In this Measurement Example, measurement was conducted without a key top. In this case 30% or more is regarded as an adequate clicking ratio.

The measurement results are shown in table 3.

TABLE 3

| TYPE OF LIGHT GUIDE PLATE AND PRESENCE OR ABSENCE OF DOME SHEET | CLICKING RATIO |
|---|---|
| POLYCARBONATE t = 0.10 mm + DOMESHEET | 30% |
| THERMOSETTING POLYURETHANE ELASTOMER SHEET (SHORE A HARDNESS 90) t = 0.10 mm | 45% |
| THERMOSETTING POLYURETHANE ELASTOMER SHEET (SHORE A HARDNESS 73) t = 0.10 mm | 46% |

As is clear from the measurement results, in the comparison measurement example, since the light guide plate is made of the polycarbonate and hence hard and the dome sheet 5 is present, the clicking ratio is low. Conversely, the structure in the present embodiment in which thermosetting polyurethane elastomer sheet with a thickness of 100 μm and a Shore A hardness of 90 is used as the base material 10 and the dome sheet 5 is omitted, yields a sufficient clicking ratio. The structure in which thermosetting polyurethane elastomer sheet with a thickness of 100 μm and a Shore A hardness of 73 is used as the base material 10 and the dome sheet 5 is omitted yields a higher clicking ratio.

Measurement Example 4

Next, a comparison is made between the keystroke durability of a light guide plate using, as a base material, silicone that is a rubber material excellent for clicking sensation and the keystroke durability of the light guide plate using, as a base material, the thermosetting polyurethane elastomer sheet in the present invention. The keystroke test is conducted under the following conditions: pressing load is 700 g; striking pointer is POM (polyacetal resin); and leading end is flat and φ1 (corner 0.1 R). In this Measurement Example, the light guide plate using silicone has a thickness of 185 μm, and the light guide plate using the thermosetting polyurethane elastomer sheet has a thickness of 100 μm. Table 4 shows the results.

TABLE 4

| SAMPLE | NUMBER OF KEYSTROKES | 1000 TIMES | 40000 TIMES | 1 MILLION TIMES | 2 MILLION TIMES |
|---|---|---|---|---|---|
| SILICONE | RESULT OBSERVABLE EFFECTS | NG DOT PEELING | NG SILICONE TEARING | NG | NG |

TABLE 4-continued

| SAMPLE | NUMBER OF KEYSTROKES | 1000 TIMES | 40000 TIMES | 1 MILLION TIMES | 2 MILLION TIMES |
|---|---|---|---|---|---|
| POLY-URETHANE ELASTOMER | RESULT OBSERVABLE EFFECTS | OK NO CHANGE | OK NO CHANGE | OK NO CHANGE | OK NO CHANGE |

As is clear from Table 4, the light guide plate with a silicone base material was subject to dot peeling and tearing of the silicone base material when the keystrokes reached 1000 times and 40000 times respectively. On the other hand, although the light guide plate with the thermosetting polyurethane elastomer sheet is flexible due to its use of a rubber material such as silicone, this light guide plate is extremely mechanically durable. Specifically, there was no change in the light guide plate even when keystrokes reached 2 million times.

Thus, it was found that even where conditions for operating individual keys greatly vary as with the ten keys of a mobile phone, a light guide plate with a thermosetting polyurethane elastomer sheet as its base material can be stably used for a long time.

What is claimed is:

1. A key module for a mobile device including:
   a key top part that is depressed by an operator, thereby inputting a signal;
   a base plate on which a fixed-side contact for generating the signal is disposed;
   a movable-side contact that is disposed on the key top part side of the fixed-side contact and is depressed by the key top part, thereby deforming and connecting to the fixed-side contact and generating the signal;
   a movable-side contact sheet that covers the movable-side contact in order to fix the movable-side contact on the base plate; and
   a light guide plate that is disposed on the key top part side of the movable-side contact sheet, causes light emitted by a light source, disposed on a side of the light guide plate, to propagate within the light guide plate, and exits the light from an exit surface of the light guide plate on the key top part side,
   wherein the light guide plate is formed by inkjet printing a dot pattern in white ink onto a surface of a base material formed from a thermosetting polyurethane elastomer sheet, which surface is opposite to the exit surface of the light guide plate.

2. A key module for a mobile device according to claim 1, wherein Shore A hardness of the base material is in the range of 90 to 98 inclusive.

3. A key module for a mobile device according to claim 2, wherein the thickness of the base material is in the range of 0.05 mm to 0.25 mm inclusive.

4. A key module for a mobile device according to claim 1, wherein the thickness of the base material is in the range of 0.05 mm to 0.25 mm inclusive.

5. A key module for a mobile device according to claim 4, wherein the white ink is UV curing white ink that is bonded to the base material by its being UV cured.

6. A key module for a mobile device according to claim 3, wherein the white ink is UV curing white ink that is bonded to the base material by its being UV cured.

7. A key module for a mobile device according to claim 1, wherein the white ink is UV curing white ink that is bonded to the base material by its being UV cured.

8. A key module for a mobile device according to claim 2, wherein the white ink is UV curing white ink that is bonded to the base material by its being UV cured.

9. The key module of claim 1, wherein the movable-side contact is disposed directly on the base plate.

10. A key module for a mobile device including:
    a key top part that is depressed by an operator, thereby inputting a signal;
    a base plate on which a fixed-side contact for generating the signal is disposed;
    a movable-side contact that is disposed on the key top part side of the fixed-side contact and is depressed by the key top part, thereby deforming and connecting to the fixed-side contact and generating the signal; and
    a light guide plate that is disposed on the key top part side of the movable-side contact, causes light emitted by a light source, disposed on a side of the light guide plate, to propagate within the light guide plate, and exits the light from an exit surface of the light guide plate on the key top part side,
    wherein the light guide plate is formed by inkjet printing a dot pattern in white ink onto a surface of a base material formed from a thermosetting polyurethane elastomer sheet, which surface is opposite to the exit surface of the light guide plate, and the light guide plate is disposed so as to cover the movable-side contact directly.

11. A key module for a mobile device according to claim 10, wherein Shore harness A of the base material is 90 or less.

12. A key module for a mobile device according to claim 11, wherein the thickness of the base material is in the range of 0.05 mm to 0.25 mm inclusive.

13. A key module for a mobile device according to claim 12, wherein the white ink is UV curing white ink that is bonded to the base material by its being UV cured.

14. A key module for a mobile device according to claim 11, wherein the white ink is UV curing white ink that is bonded to the base material by its being UV cured.

15. A key module for a mobile device according to claim 10, wherein the thickness of the base material is in the range of 0.05 mm to 0.25 mm inclusive.

16. A key module for a mobile device according to claim 15, wherein the white ink is UV curing white ink that is bonded to the base material by its being UV cured.

17. A key module for a mobile device according to claim 10, wherein the white ink is UV curing white ink that is bonded to the base material by its being UV cured.

18. The key module of claim 10, wherein the movable-side contact is disposed directly on the base plate.

19. A key module for a mobile device including:
    a depressible key top part;
    a base plate including a fixed-side contact disposed thereon;
    a dome disposed over the fixed-side contact on a side of the fixed-side contact that faces the key top part, the dome being contacted by the key top part upon depression of the key top part such that depression of the key top part inputs a signal that is transferred to the fixed-side contact through the dome;
a contact sheet that covers the dome in order to fix the dome to the base plate; and
a light guide plate disposed on the contact sheet on a side of the contact sheet that faces the key top part, the light guide plate operable to cause light emitted by a light source to propagate within the light guide plate and exit the light guide plate from an exit surface that faces the key top part,
wherein the light guide plate is formed from a thermosetting polyurethane elastomer sheet.

* * * * *